March 2, 1971 E. T. SZUMIGALA 3,566,514
MANUFACTURING METHOD FOR BOILING SURFACES
Filed May 1, 1968 4 Sheets-Sheet 1

INVENTOR
EDWARD T. SZUMIGALA
BY John C. Le Fever
ATTORNEY

INVENTOR
EDWARD T. SZUMIGALA
BY John C. Werner
ATTORNEY

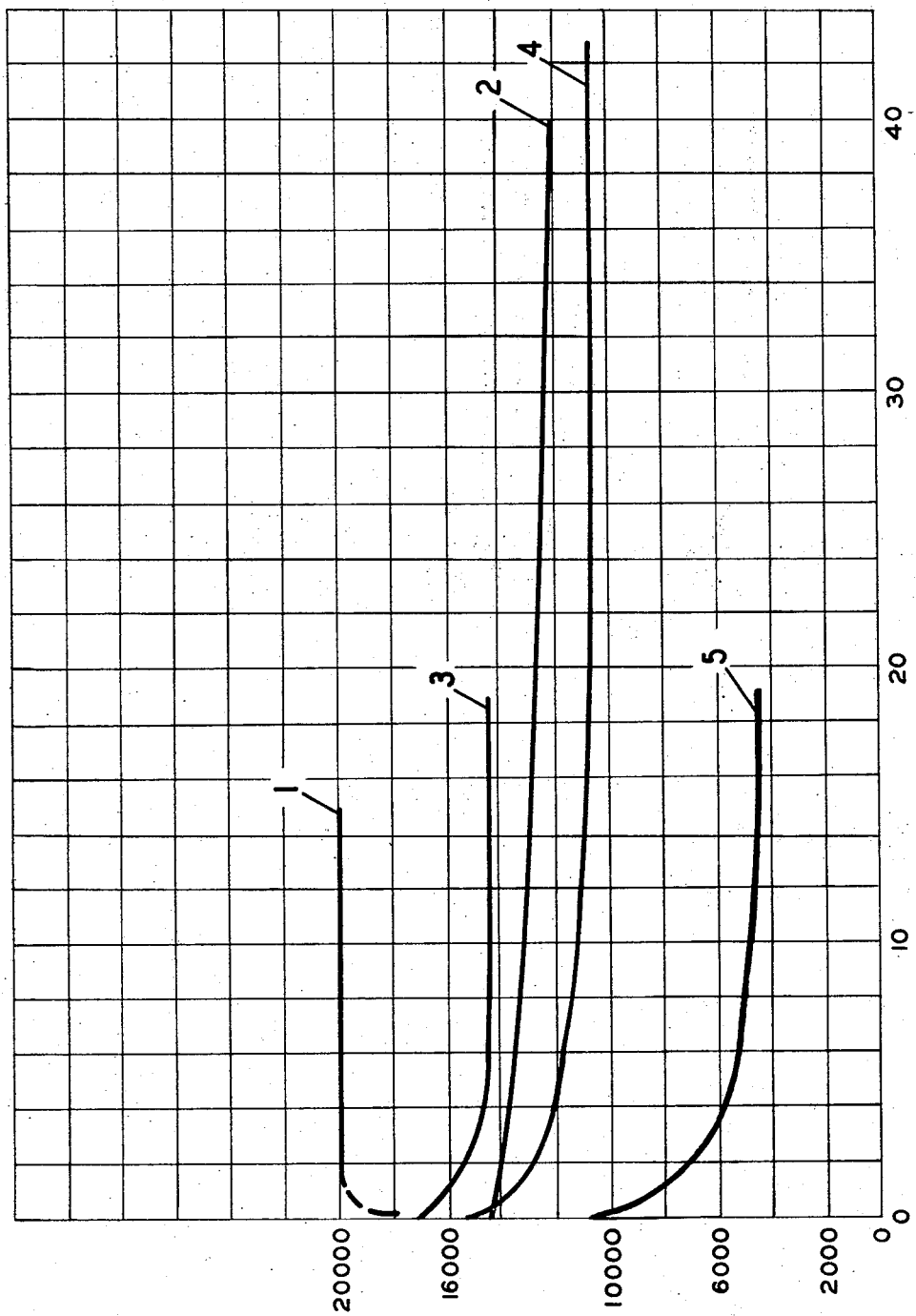

United States Patent Office 3,566,514
Patented Mar. 2, 1971

3,566,514
MANUFACTURING METHOD FOR BOILING SURFACES
Edward T. Szumigala, Cheektowaga, N.Y., assignor to Union Carbide Corporation
Filed May 1, 1968, Ser. No. 725,789
Int. Cl. B23p 13/04
U.S. Cl. 29—558                               8 Claims

ABSTRACT OF THE DISCLOSURE

A boiling surface layer is formed from a thermally conductive wall by first cutting deep parallel grooves with metal removal, then cutting shallower grooves parallel to and between the first grooves, and then knurling to provide subsurface cavities with restricted openings to the outer surface.

BACKGROUND OF THE INVENTION

This invention relates to the manufacture of a contoured layer from a thermally conductive metal wall by cutting and metal displacement, the resulting layer containing surfaces which are highly effective in the promotion of nucleate boiling.

Application Ser. No. 634,403, filed Apr. 7, 1967 in the name of L. C. Kun et al., now Pat. No. 3,454,081, describes and claims these contoured layers which have a plurality of ridges in the wall separated by grooves provided at microscopic density, as for example 20 grooves per inch. The outer sections of these ridges are partly deformed into the grooves such that a plurality of sub-surface cavities are formed therein to entrap bubbles which provide boiling nucleation sites. These cavities communicate with the outer surface of the contoured layers through restricted openings having smaller cross-sectional area than the largest cross-sectional area of the cavity interior. In this manner the restricted openings permit vapor egress from the cavities to the outer surface of the contoured layer and/or liquid ingress. The resulting vapor bubble passes through the liquid film of the colder boiling fluid and travels to the liquid-vapor interface for disengagement into the gas space bounding the boiling liquid in the first passageway, and is discharged therefrom. At any particular moment when vapor is being emitted from certain cavities, other cavities are receiving liquid from the film through their restricted openings to the outer surface of the contoured layers. Sub-surface openings are also provided in these contoured layers between the interiors of at least some adjacent cavities, thereby affording fluid communication between such cavities.

The aforementioned Kun et al. application also describes and claims certain methods for manufacturing this boiling surface layer, as for example cutting a series of parallel first grooves so as to form first ridges separating adjacent grooves, and then cutting a series of parallel second grooves at an angle to the orientation of the first ridges so as to form second ridges and the sub-surface cavities in the first grooves. The first grooves may, for example, be formed by metal removal, e.g. milling, or by metal displacement, e.g. scoring. This surface has a cross-grooved appearance. Alternatively the first ridges may be deformed by metal displacement techniques such as rolling or knurling to form the sub-surface cavities, restricted openings, and sub-surface intercommunications.

The optimum cavity size is a function of the liquid to be boiled. Larger cavities are preferred for use with relatively high surface tension liquids such as water, and densities of between 20 and 120 grooves per inch are preferred therefor. A relatively high groove density aids in the formation of smaller cavities which function better in boiling liquids having relatively low surface tensions such as liquid oxygen and nitrogen. For these two liquids and for liquids having similar surface tensions, a groove density of between 140 and 200 grooves per inch is preferred.

It has been found that in the formation of certain boiling surface layers and particularly those requiring relatively large cavities, the scoring technique tends to reclose the bottom of the first or primary grooves. Scoring is effective because it laterally deforms metal at the top of the groove, but it also undesirably laterally deforms metal at the grooves base.

One possible solution is to form the first grooves by metal removal or milling. This produces a relatively large open primary groove whose base is not prone to reclosing when metal is subsequently deformed over the groove top. However, with metal removal there is very little lateral displacement of metal during formation of the first ridges and such displacement is ultimately necessary to provide the restricted openings to the outer surface. Under these circumstances the second or cross-grooving step must be solely relied on to provide such geometry, but this in turn requires so much metal deformation during cross-grooving that the size of the restricted openings cannot be controlled or reproduced precisely.

It is an object of this invention to provide a method for manufacturing boiling surface layers which does not laterally deform metal at the primary groove base yet deforms metal at the groove top so as to permit precisely controlled restricted outer openings which can be reproduced.

Another object is to provide a manufacturing method for boiling surface layers having 20–120 grooves per inch and reproducably controlled size.

Still another object is to provide a manufacturing method for forming water boiling surface layers from difficulty workable corrosion-resistant copper alloys.

Other objects and advantages of this invention will be apparent from the ensuing disclosure and the appended claims.

SUMMARY

It has been unexpectedly discovered that the aforedescribed objects may be achieved by a three-step procedure. A series of parallel primary first grooves are cut at first depth and at microscopic density by metal removal to form first ridges separating adjacent grooves. This first cut is relatively deep, as for example 0.025 inch for water boiling surfaces, and does not laterally displace sufficient quantities of metal to alter significantly the contour of successively formed grooves.

In the second step, a series of parallel second grooves are cut in a direction parallel to the first grooves and substantially midway between adjacent first grooves on the first ridges. These second grooves are cut by lateral displacement of metal, as for example by scoring, thereby separating the first ridges into two portions. The openings separating such portions of adjacent first ridges are thereby restricted to a smaller width than the space between adjacent first ridges formed by the first grooving step. Stated otherwise, lateral displacement of the outermost metal tends to curl the ridge portions over the first grooves but the bottom of these grooves is not closed by such displacement. In the water boiling surface embodiment these restricted openings are preferably about 0.0055 inch wide.

The third and final step is downwardly knurling the two portions of the first ridges to produce indentations extending perpendicular to the first and second grooves.

This knurling is at depth sufficient to alternately close the restricted openings and to further restrict the intervening longitudinal segments of the restricted openings. For water boiling surfaces the further restricted openings are preferably about 0.0025 inch wide. This knurling step is performed by rolling a knurled wheel over the surface in a direction parallel to the first and second grooves making knurl impressions having a shallow depth relative to the first grooves.

BRIEF DESCRIPTION OF THE DRAWINGS

In the drawings:

FIG. 10 is a graph showing pool boiling performance data in water for surfaces prepared by this invention and by cross-scoring.

It should be appreciated that the surfaces depicted in the figures are greatly magnified in size for illustrative purposes, and the actual surfaces are microscopic in nature.

DESCRIPTION OF THE PREFERRED EMBODIMENTS

Figure 1:
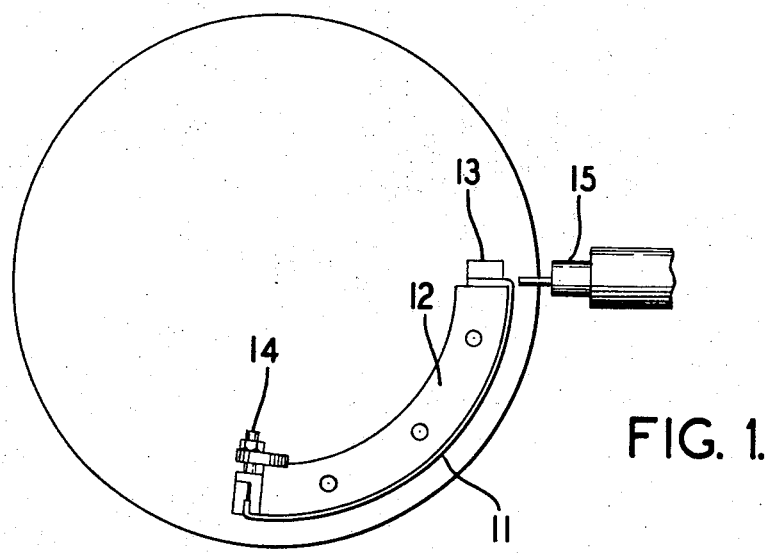
FIG. 1 is a schematic plan view of apparatus suitable for practicing the manufacturing method of this invention.
Figure 2:
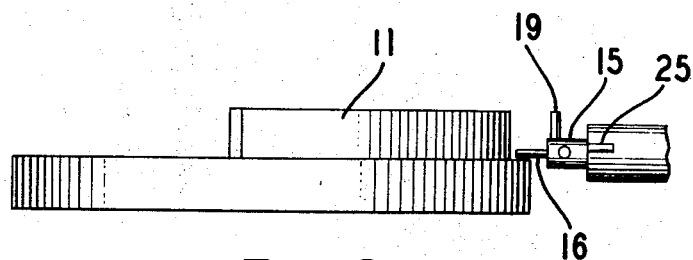
FIG. 2 is an elevation view of the same FIG. 1 apparatus.

Referring now to the drawings and specifically to FIGS. 1 and 2, the thermally conductive metal wall, as for example copper alloy sheet 11, may be wrapped around fixture 12 shaped in the form of an annular sector of a cylinder. Sheet 11 is secured at one end by fixed clamp 13 and at the other end by adjustable progressive clamp 14. Sheet 11 is tightened against cylindrical fixture 12 by clamp 14, preferably while tapping the sheet with a resilient mallet. The fixture 12 with sheet 11 attached thereto is rotated about its axis in a machine, as for example a lathe or vertical boring mill which has a rigid turret tool holder 15 capable of accurate feed measurement.

Figure 3:
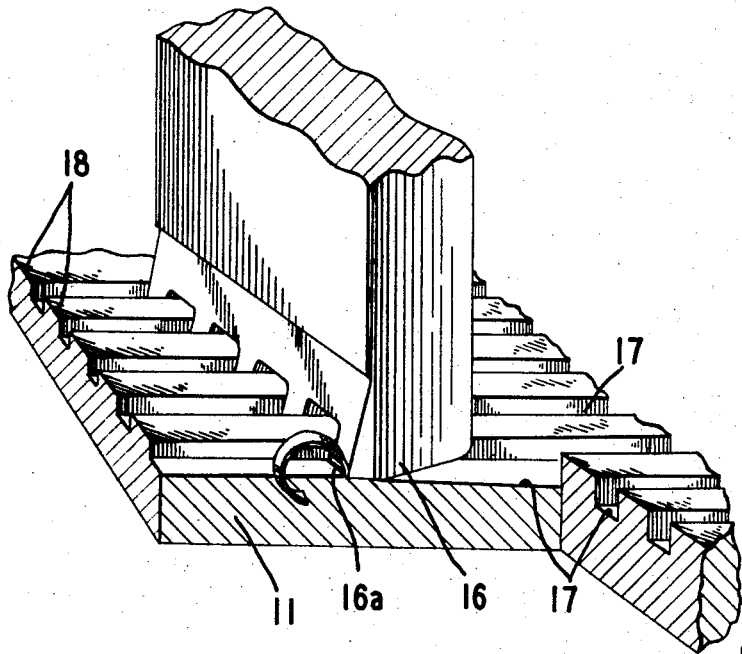
FIG. 3 is an isometric view looking downwardly on the first grooving-metal removal step.
Figure 4:
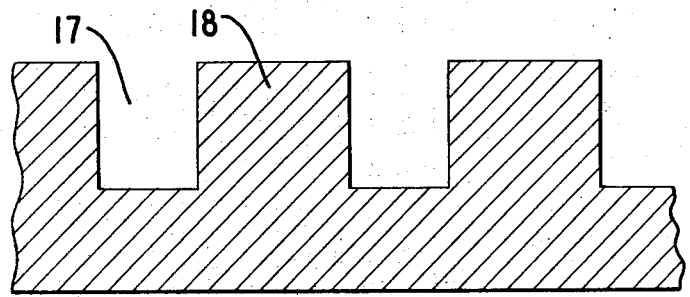
FIG. 4 is an end view taken in cross-section of a wall after the first grooving-metal removal step.

The first step in the manufacturing method as illustrated in FIG. 3 may be performed with a multiple point tool 16 having flat-nosed teeth 16a spaced apart across the tool width, e.g. one inch. The metal is removed from the first grooves 17 in a direction parallel to the direction of relative movement between the tool and work, thereby forming first ridges 18 (see FIG. 4). Tool 16 is similar to a parting or slotting tool and has a leading edge which is flat with sharp corners, so as to remove the metal from the first groove 17 as cleanly as possible. This first groove 17 is preferably cut by feeding the tool 16 slowly into the groove, taking a light initial cut followed by incremental cuts until the final depth, e.g. 0.025 inch is reached. In FIG. 3 a corner of the sheet 11 has been removed to illustrate the nearest tooth 16a within its first groove 17. FIG. 4 illustrates the configuration of these grooves 17 on completion of the first step. The center-to-center distance between adjacent first grooves, e.g., 0.050 inch, is preferably more than twice the groove width, e.g. 0.020 inch.

Figure 5:
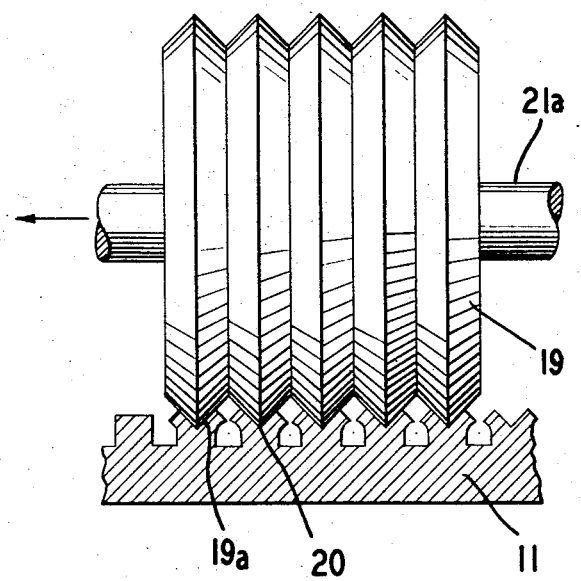
FIG. 5 is an end view taken in cross-section showing the second grooving-metal displacement step.

The tool holder 15 is now rotated to contact the metal displacement tool 19 with sheet 11 for the second grooving step. Lancing or scoring tool 19 is similar to a thread rolling tool and may have circumferential teeth 19a of 90° included angle and spaced the same center-to-center distance apart as the teeth of metal removing tool 16. As illustrated in FIG. 5, tool 19 slices through sheet 11 with a sharp edge 20 thereby displacing rather than removing metal from its path to form second grooves 21. Stated otherwise, with scoring the metal is displaced outwardly and approximately normal to the direction of relative movement between the tool and work. Second grooves 21 are preferably shallower than first grooves 17. It has been found that lancing to the full depth of the first grooves causes substantial sheet growth and can be avoided by lesser penetration with a wider included angle on tool 19.

After a group of second grooves 21 have been cut, shaft 21a carrying circumferential teeth 19a may be repositioned over additional uncut first ridges 18 by movement normal to these ridges. In preferred practice, both the first and second grooves are produced in sequential groups of equal width, thereby completing both steps 1 and 2 before proceeding to fresh metal.

Figure 6:
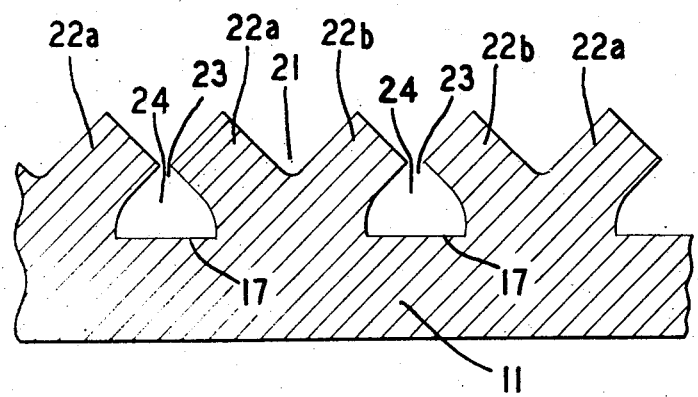
FIG. 6 is an end view taken in cross-section of the FIG. 4 wall after the second grooving-metal displacement step of FIG. 5.

FIG. 6 shows that in forming the shallow second grooves 21, the first ridges 18 are split into two preferably equal portions 22a and 22b preferably separated by an included angle of about 90°, thereby restricting the openings 23 separating such adjacent portions 22a or 22b of adjacent first ridges. A comparison of FIGS. 4 and 6 also reveals that in the second grooving step the two portions 22a and 22b of each first ridge 18 are laterally displaced away from each other and respectively inclined over the bottoms of adjacent first grooves so as to each form one side wall of cavities 24 within the first grooves. The other side wall of cavities 24 is formed when the first ridge 18 separating a given first groove 17 from the adjacent groove 17 is separated in the second grooving step.

Figure 7:
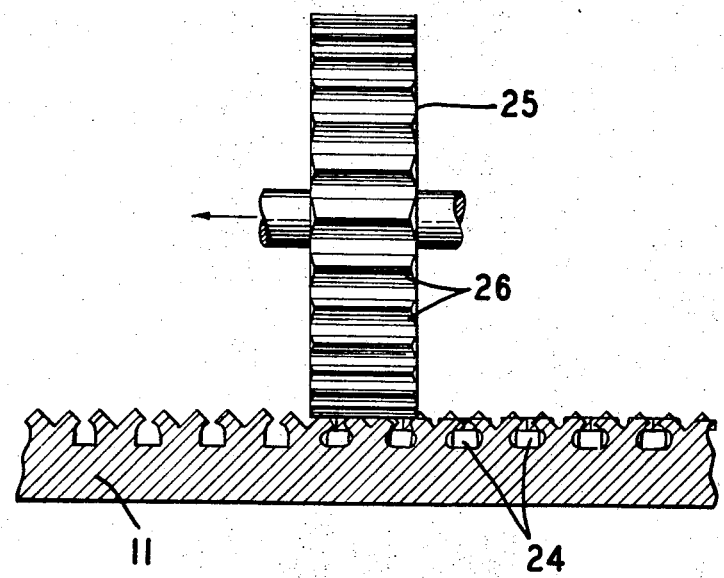
FIG. 7 is an end view taken in cross-section showing a suitable third knurling step as performed with a circular tool.

Although cavities 24 with restricted outer openings 23 are formed in the second grooving step as illustrated in FIG. 6, these openings, e.g. 0.0055 inch wide, are not sufficiently small for stable retention of nucleate bubbles in cavities 24. Tool holder 15 is again rotated to present the knurling tool 25 to sheet 11. The knurling tool 25 as illustrated in FIG. 7 may be a standard commercial ¾-inch diameter knurling wheel containing perhaps one hundred and eighteen 70° teeth 26 (50 per circumferential inch). The movement of the knurl wheel 25 with respect to sheet 11 is parallel to the direction of the first and second grooves, and the knurl 25 advances toward the left on successive passes across the sheet. The depth of the knurling penetration determines the size of further restricted opening 27, and it is the latter's smallest cross-sectional dimension which should preferably be gauged for the knurling step rather than the tool penetration. For a water boiling surface the size of further restricted opening 27 is preferably about 0.0025 inch and should be measured occasionally during the knurling step to maintain proper tool adjustment.

Figure 8:
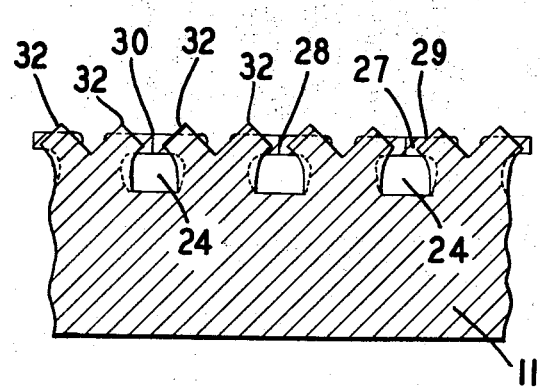
FIG. 8 is an end view taken in cross-section of the FIG. 6 wall after the third knurling step of FIG. 7.
Figure 9:
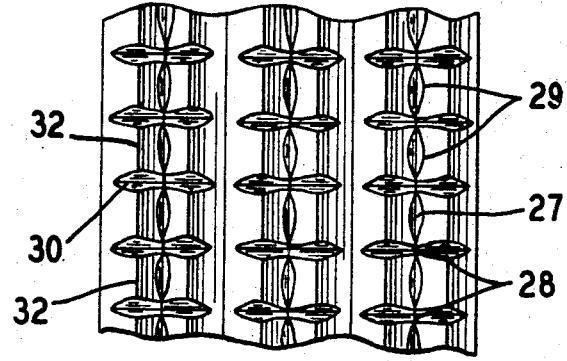
FIG. 9 is a plan view looking downwardly on the FIG. 8 boiling surface.

FIGS. 7–9 also illustrate the final configuration of the as-knurled boiling surface layer whereby certain segments 28 of the restricted openings have been closed. That is, in these segments the teeth 26 of knurling tool 25 have downwardly displaced the inwardly inclined adjacent first ridge portions 22a or 22b sufficiently to bring these segments 28 into or near physical contact with each other. The segments 29 of the first ridge portions separating adjacent closed segments 28 are also downwardly displaced, but not sufficiently for closure. These open segments 29 comprise the walls of further restricted openings 27. It should be noted that features of the FIG. 9 plan view are in vertical alignment with corresponding features of the FIG. 8 cross-sectional elevation view. The knurl impressions appear as horizontal indentations 30 across the vertically aligned ridge prominences 32. These knurl impressions interrupt the continuous slit openings into the sub-surface tunnel cavities 24 to form oval-shaped further restricted openings 27 for liquid ingress and vapor egress from the active nucleation sites along the tunnel having sub-surface openings between adjacent cavities.

When the knurling step is complete, the sheet 11 is removed from fixtures 13 and 14, and degreased in a suitable solvent, as for example acetone or carbon tetrachloride. The sheet is then straightened and preferably exposed to a dry hydrogen atmosphere at elevated temperature for sufficient duration to anneal the metal and to remove residual contaminants, e.g. 4 hours at 1700° F.

The three-step manufacture of this invention is advantageously performed on a rotary machine such as a lathe or boring mill because the sheet is easily restrained thereon. However, the contoured surface may also be formed on a flat sheet, as for example using a planing mill or a shaper with a vacuum chuck for firmly holding the sheet. The specific dimensions and specifications described hereinabove are appropriate for copper and copper alloy. Other metals may require different tool shapes, penetrations and groove spacing in order to achieve the same final cavity geometry. The metal removal first step is more difficult to perform in copper than in other metals, as for example aluminum, due to the former's extremely high ductility. Copper tends to be displaced rather than sheared and chipped out, and copper sheeting tends to grow, i.e. flat dimensions increase during cutting. It was found, however, that rotary machines with mechanical clamps were suitable for performing the metal removal step in copper.

The advantages of this invention were illustrated in a series of comparative tests in which five different contoured surfaces were prepared from copper alloy sheet containing 2.5 weight percent iron and used for boiling distilled water at a heat flux of about 20,000 B.t.u./hr.× ft.². Data from the water boiling tests is summarized in FIG. 10. The manufacturing specifications for these surfaces are summarized in Table I as follows:

TABLE I

| Surface Number | Description |
| --- | --- |
| 1 | 1st groove density 20 grooves per inch (g.p.i.), 0.025 in. deep x 0.020 in. wide with milling tool; 2d groove density 20 g.p.i., 0.015 in. deep with scoring tool of 30° included angle cutting tip; knurling with 50-pitch 70° teeth wheel of 0.009 in. root depth. Largest cross-sectional width of further restricted openings is 0.0035 in. |
| 2 | 1st groove density 20 g.p.i., 0.020 in. deep x 0.020 in. wide with milling tool; 2d groove density 20 g.p.i., 0.018 in. deep with scoring tool of 30° included angle cutting tip; knurling with 50-pitch 70° teeth wheel of 0.009 in. root depth. Largest cross-sectional width of further restricted openings is 0.0027 in. |
| 3 | 1st groove density 20 g.p.i., 0.025 in. deep x 0.020 in. wide with milling tool; 2d groove density 20 g.p.i., 0.015 in. deep with scoring tool of 45° included angle cutting tip; knurling with 50-pitch 70° teeth wheel of 0.009 in. root depth. Largest cross-sectional width of further restricted openings is 0.0025 in. |
| 4 | 1st groove density 60 g.p.i., 0.018 in. deep with double-edged scoring tool of 30° included angle cutting tip and 0.008 in. nose radius inclined 5° over grooved sheet; 2d groove density 60 g.p.i. and 90° to 1st grooves, 0.010 in. deep with double-edged scoring tool of 30° included angle cutting tip and 0.008 in. nose radius, with 1st and 2d grooves cut on forward and reverse strokes. |
| 5 | 1st groove density 60 g.p.i., 0.020 in. deep with circular scoring tool of 30° included angle inclined 5° over grooved sheet work; 2d groove density 60 g.p.i. and 90° to 1st grooves, 0.010 in. deep with circular scoring tool of 30° included angle inclined 5° over grooved sheet. |

As will be apparent from Table I, surfaces 1, 2 and 3 were prepared by the three-step manufacturing method of this invention. FIG. 10 shows that their initial performance was quite remarkably high ($h_b$=16,500, 14,300 and 16,700 B.t.u./hr.×ft.²×° F., respectively) and this high performance was largely retained over periods of extended boiling. The fractional losses in the value of the coefficients was 0%, 16% and 14%, respectively, for the surfaces 1, 2 and 3.

Surfaces 4 and 5 were prepared by the cross-scoring method described and claimed in the previously referenced Ser. No. 634,403. While the water boiling coefficients were initially very high (about 16,000 and 10,000 B.t.u./hr.×ft.²×° F., respectively), this performance declined somewhat with time, indicating that some of the cavity-restricted opening nucleation sites became inactive. The fractional loss in the value of the coefficients was about 33% for surface 4 and about 58% for surface 5, over the time period of the tests.

In commercial use, boiling heat transfer surfaces usually operate continuously over long periods of time. If the boiling coefficient diminishes as boiling proceeds, the lower and stabilized coefficient is the one which must be used when sizing and fabricating the heat exchanger. Table II summarizes the initial coefficient, stabilized coefficient and fractional loss for surfaces 1–5.

TABLE II

| | Initial coefficient, B.t.u./hr. × ft.² × ° F. | Stabilized coefficient, B.t.u./hr. × ft.² × ° F. | Fractional loss, percent |
| --- | --- | --- | --- |
| Surface: | | | |
| 1 | [1] 16,500 | 20,000 | 0 |
| 2 | 14,300 | 12,000 | 16 |
| 3 | 16,700 | 14,300 | 14 |
| 4 | 16,000 | 10,600 | 33 |
| 5 | 10,000 | 4,400 | 58 |

[1] The initial coefficient for surface 1 is lower than the stabilized coefficient because the test was conducted before the surface had become fully active.

It should be recognized that although the stabilized water boiling coefficients for surfaces 4 and 5 are significantly lower than for surfaces 1–3, the former still represent a substantial improvement over non-contoured surfaces. For example, the water boiling coefficient for smooth metal surfaces under comparable conditions is about 1440 B.t.u./hr.×ft.²×° F., and shown in FIG. 10 as a dotted horizontal line for comparison.

The importance of the knurling step was illustrated by two tests conducted on the same copper sheet containing 2.5 weight percent iron. The first grooves were cut by metal removal at density of 20 grooves per inch with a 30° included angle and to a depth of 0.018 inch. The second grooves were cut by metal displacement in a direction parallel to the first grooves, and also at density of 20 grooves per inch to a depth of 0.010 inch. The scoring tool for this metal displacement cut was similar to that of FIG. 5 and the second grooves cut into the first ridges separating the adjacent first grooves mid-way therebetween. The resulting surface was then tested for water boiling heat transfer at one atmosphere, and at a heat flux of 20,000 B.t.u./hr.×ft.² the boiling coefficient was 3600 B.t.u./hr.×ft.²×° F. This coefficient was obtained after the heat was interrupted for sufficient time to produce flooding.

Next the same surface with the first deep grooves and second grooves was downwardly knurled with a 50-pitch, 70° wheel in a direction parallel to the grooves. This surface was then tested for water boiling under the same conditions as the twice-grooved surface, and the boiling coefficient increased to 9100 B.t.u./hr.×ft.²×° F. This 2.5-fold improvement demonstrates that in this particular manufacturing method, the knurling step is essential to the formation of the further restricted openings to the outer surface of sufficiently small cross-section to form a permanently active surface.

Flat sheets provided with a contoured boiling surface by this invention can subsequently be formed and shaped to relatively small radii of curvature without detriment to boiling performance. For example, tubes 3 inches in diameter have been formed with the contoured surface on the interior and have exhibited high boiling coefficients. The aforementioned flat sheets having the contoured boiling surface may also be fabricated without shaping into a heat exchanger of the plate type. For example, extended surfaces in the form of corrugated fins may be brazed to the uncontoured side of flat parting sheet separating the fluid passageways. Such extended surfaces would improve the heat transfer coefficient for the warmer fluid but would preferably be omitted in the fluid passageway having the contoured boiling surface. This is because the brazing of extended surfaces to the passageway walls would tend to plug the further restricted cavity openings of the contoured surface and thereby reduce its effectiveness. Such exchangers using the contoured boiling surface and their method of fabrication are not part of the present invention.

Summarizing the advantages of this invention, it affords a method for precisely and reproducibly preparing a contoured boiling surface in which each sub-surface cavity and further restricted outer opening is produced with maximum control over its shape and size. The uniformity of these cavities and openings is quite evident from photomicrographs of the as-formed surfaces. Another advantage is the ruggedness of the surface produced by the invention. The metal which forms the cavity and its openings is relatively massive and the surface is not susceptible to deterioration by erosion and unavoidable corrosion. Remarkably high boiling heat transfer coefficients and boiling stability of the resulting surface has been experimentally demonstrated. The cavities are large, tightly closed and ideally suited for retaining vapor nuclei. The open sub-surface communication between adjacent cavities promotes the propagation of boiling activity from cavity to cavity resulting in prompt restoration of boiling capacity from an inactive (flooded) condition.

Although certain embodiments have been described in detail, it will be appreciated that other embodiments are contemplated along with modifications of the disclosed features, as being within the scope of the invention. For example, the desired cavity size may be obtained by varying any or all of the aforedescribed factors, i.e., the shape of the tool cutting edge, tool penetration and groove spacing. The physical properties of the base metal must also be considered.

What is claimed is:
1. A method for forming a boiling surface from a thermally conductive metal wall comprising the steps of:
    (a) cutting a series of parallel first grooves at first depth and microscopic density in said wall so as to remove metal from the grooves and form first ridges separating adjacent grooves;
    (b) cutting a series of parallel second grooves in a direction parallel to said first grooves and into said first ridges so as to outwardly displace metal from and perpendicular to said second grooves thereby separating said first ridges into two portions and restricting the openings separating such adjacent portions of adjacent first ridges; and
    (c) downwardly knurling the two portions of said first ridges to produce indentations extending perpendicular to said first and second grooves at depth only sufficient to alternately close longitudinal segments of the restricted openings and further restrict other intervening longitudinal segments of said restricted openings thereby forming: (1) a plurality of sub-surface cavities in said first grooves communicating with the outer surface through the further restricted openings having smaller cross-sectional area than the largest cross-sectional area of the cavity interiors, and (2) sub-surface openings between at least some adjacent cavities for fluid communication therebetween.

2. A method according to claim 1 in which a copper-alloy forms said metal wall.

3. A method according to claim 1 in which said first ridges are separated into said two portions by cutting step (b) such that the included angle between said two portions is about 90 degrees.

4. A method according to claim 1 in which said second grooves are cut at shallower depth than said first grooves.

5. A method according to claim 1 in which said first depth of parallel first grooves is about 0.025 inch.

6. A method according to claim 1 in which said openings are restricted to about 0.0055 inch wide in cutting step (b).

7. A method according to claim 1 in which said openings are further restricted to about 0.0025 inch wide in knurling step (c).

8. A method for forming a water boiling surface according to claim 1 in which a copper-base alloy forms said metal wall, said first depth or parallel first grooves is about 0.025 inch, said first ridges are separated into said two portions by cutting step (b) such that the included angle between said two portions is about 90 degrees and said openings are restricted to about 0.0055 inch wide, and said restricted openings are further restricted to about 0.0025 inch wide.

References Cited
UNITED STATES PATENTS

| | | | |
|---|---|---|---|
| 3,025,685 | 3/1962 | Whitlow | 165—133X |
| 3,235,004 | 2/1966 | Beurtheret | 165—185 |
| 3,299,949 | 1/1967 | Beurtheret | 165—185 |
| 3,326,283 | 6/1967 | Ware | 165—185X |
| 3,457,990 | 7/1969 | Theophilos et al. | 165—185X |
| 3,454,081 | 7/1969 | Kun et al. | 165—185X |

JOHN F. CAMPBELL, Primary Examiner

V. A. DI PALMA, Assistant Examiner

U.S. Cl. X.R.

165—133, 185